June 16, 1953  F. R. PORTER, JR  2,641,842
MEASURING INSTRUMENT
Filed Nov. 2, 1951
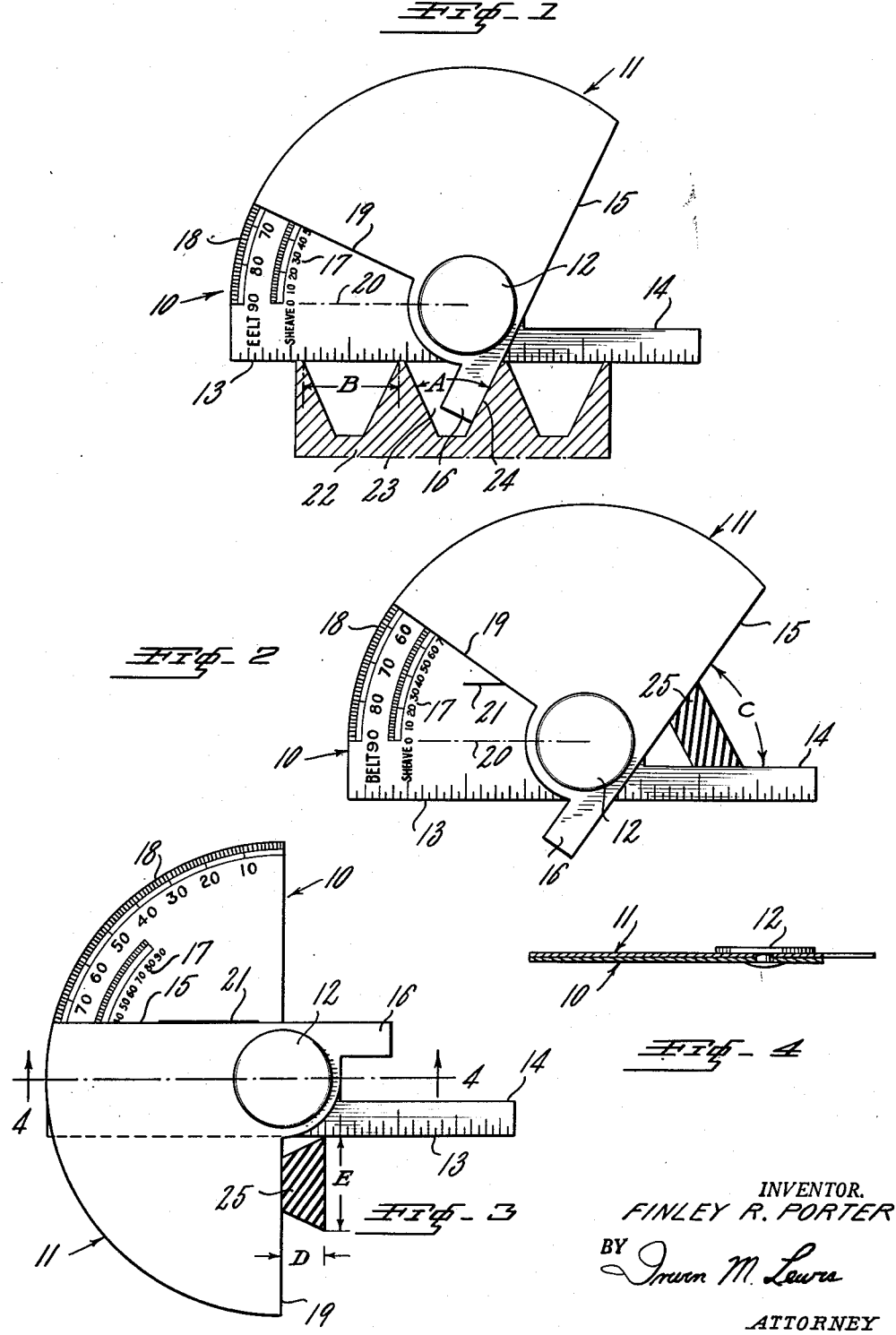
INVENTOR.
FINLEY R. PORTER
BY Irwin M. Lewis
ATTORNEY Patented June 16, 1953

2,641,842

UNITED STATES PATENT OFFICE 2,641,842

MEASURING INSTRUMENT

Finley R. Porter, Jr., Westfield, N. J., assignor to United States Rubber Company, New York, N. Y., a corporation of New Jersey Application November 2, 1951, Serial No. 254,556

1 Claim. (Cl. 33—75)

This invention relates to a measuring instrument and in particular to a measuring instrument for use in determining various dimensions of V-belts and V-belt sheaves.

In V-belt installations and replacements it is necessary to determine the proper size belt for a particular V-belt sheave. In making this determination it is necessary that the angle and top width of the groove of the sheave, the belt angle, the top width of the belt and the thickness of the belt be known. It is one object therefore of the present invention to provide a single, compact instrument for determining these dimensions quickly and accurately.

It is another object of the invention to provide a simple measuring instrument which may be used to directly determine the groove angle of a V-belt sheave.

Another object is to provide a simple, compact, combination measuring instrument which may be used to directly determine both the groove angle of a V-belt sheave and the belt angle of a V-belt.

A still further object is to provide a combination measuring instrument which may be used to directly determine the groove angle of a V-belt sheave, the belt angle of a V-belt and the thickness of a V-belt.

Other objects and advantages of the present invention will become apparent from the following description when read in conjunction with the accompanying drawings, wherein:

Fig. 1 is an elevational view of the measuring instrument of the present invention showing the instrument as applied to a V-belt sheave to determine the groove angle thereof, Fig. 2 is an elevational view of the measuring instrument of the present invention showing the instrument as applied to a V-belt to determine the angle thereof, Fig. 3 is an elevational view of the measuring instrument of the present invention showing the instrument as applied to a V-belt to determine the thickness thereof, and Fig. 4 is a cross-sectional view taken on the line 4—4 of Fig. 3.

Referring to the drawing, the measuring instrument of the present invention includes a first flat plane member 10 and a second flat plane member 11 pivotally attached to the first in overlying parallel relationship by means of a rivet 12 or other fastening device. Members 10 and 11 are therefore angularly adjustable relative to each other. The members 10 and 11 may be made of cardboard, metal, plastic or other suitable material having a fair degree of stiffness.

Member 10 is provided with a first straight edge 13 graduated so that it may be used in making linear measurements as will hereinafter be described. Member 10 is also provided with a second straight edge 14 which is parallel to straight edge 13. Member 11 is provided with a first straight edge 15 terminating at one end in a short narrow projecting portion 16. As shown in Figs. 1 and 2 straight edge 15 extends across and beyond both of the parallel straight edges 13 and 14 in certain relative angular positions of the members 10 and 11. As shown in the drawings, the straight edge 14 is carried by a narrow projecting portion so that the straight edge 15 may extend across both straight edges 13 and 14 without being unduly long.

Member 10 is provided with a pair of graduated arcuate scales 17 and 18, the first marked "Sheave" and the second marked "Belt." The center of curvature of the arcuate scales is at the point of pivotal attachment of the members 10 and 11. Member 11 is provided with a second straight edge 19 which extends radially from the point of pivotal attachment of the members 11 and 12 and perpendicular to the first straight edge 15. The straight edge 19 is of the length to extend across both the scale 17 and 18 and thereby serves as an indicator line.

The graduations of scale 17 are such as to give a reading at the point that the straight edge 19 extends thereacross equal to twice the angle existing between that portion of the straight edge 15 carried by the projecting portion 16 and a line perpendicular to the straight edge 13. As will be later brought out this scale is used for determining the angle of the V-belt groove in a V-belt sheave. The markings on the scale 17 are made to indicate twice the value of the actual arc length subtended. For example at the 10° mark, the arc length is actually only 5°, for the 20° mark the arc length is actually 10°, etc. By this provision, the reading is automatically twice the actual angle existing between that portion of the straight edge 15 carried by the projecting portion 16 and a line perpendicular to the straight edge 13. The markings on the scale 17 are of increasing value from a base line 20 which is parallel to the straight edge 13 and extends through the point of pivotal attachment.

The scale 18 is marked to indicate the actual arc subtended and the markings are of decreasing value beginning with a 90° mark at the base line 20 and terminating 90° from the base line 20. Scale 18 therefore will give a reading at the point the straight edge 19 extends thereacross equal to the angle existing between that portion of the straight edge 15 extended beyond the straight edge 14 and the straight edge 14. This scale is used in determining the belt angle as will hereinafter be described.

The straight edge 19 is of sufficient length to extend a considerable distance below the straight edge 13 in certain relative positions of the members 10 and 11 as shown in Fig. 3. Member 10 is provided with a straight reference line 21, best shown in Figs. 2 and 3, which is parallel to the straight edge 13 and which is positioned a distance above the base line 20 equal to the perpendicular distance between the straight edge 15 and the pivotal center of the members 10 and 11. When the members 10 and 11 are adjusted so that the straight edge 15 is in alignment with the reference line 21, the straight edge 19 will extend below the straight edge 13 and at right angle thereto as shown in Fig. 3. In this position the instrument may be used as a square to determine the thickness of a V-belt as shown in Fig. 3.

Referring to Fig. 1, there is shown the manner in which the measuring instrument of the present invention is used in determining the groove angle of a V-belt sheave 22. As shown the straight edge 13 is placed across the peripheral face of the sheave 22 and the member 11 is adjusted relative to the member 10 so that the projecting portion 16 extends into the V-belt groove 23 with the portion of the straight edge 15 carried by the projecting portion 16 in linear contact with the sidewall 24 of the groove 23. The projecting portion 16 is made short and narrow for this purpose. In this position, the reading of the scale 17 marked "Sheave" at the point where the straight edge extends across the scale will be equal to the groove angle A. The reading gives the full angle because the scale 17 is marked to indicate twice the actual value of angle between the portion of the straight edge 15 carried by the projecting portion 16 and a line perpendicular to the straight edge 13. From simple geometry it can be seen that this angle is equal to one-half of the groove angle A.

That portion of the straight edge 15 carried by the projecting portion 16 may also be used as a gage to determine whether the side wall 24 of the sheave groove has worn irregularly. This is done by placing this portion of the straight edge 15 against the side wall. If the straight edge 15 makes linear contact with the wall then the groove is satisfactory. If the straight edge 15 makes only joint contact at various points along its length then the groove wall has worn irregularly and the sheave should be scrapped if the irregular wear is excessive. The graduated straight edge 13 is used to determine the top width B of the groove 23.

Referring to Fig. 2, there is shown the manner in which the same instrument may be used in determining the angle of a V-belt 25. As shown, the instrument is adjusted so that the straight edge 14 is in linear contact with one side of the belt 25 and the straight edge 15 is in linear contact with the other side of the belt 25. In such a position, the scale 18, marked "Belt" will give a reading at the point where the straight edge 19 extends thereacross equal to the belt angle "C."

Referring to Fig. 3, there is shown the manner in which the same instrument is used to determine the thickness of a V-belt 25. As shown, the instrument is adjusted so that the straight edge 15 is in alignment with the reference line 21. In this position, the straight edge 19 extends below the straight edge 13 and at right angles thereto to form a square. By placing the straight edge 19 in linear contact with one face of the belt 25, the thickness "D" of the belt may be determined by reading the graduations of a straight edge 13. Graduated straight edge 13 is also used to determine the top width "E" of the belt 25.

From the above description it can be seen that there is provided a simple compact combination measuring instrument which may be used to quickly and accurately determine a plurality of dimensions on V-belt and V-belt sheaves. The instrument is also useful in laying out V-belt sheaves to scale and for determining the length of belt needed by using the instrument as a scale and protractor and measuring the length of the belt from the layout.

It is to be understood that the above description and accompanying drawing is for the purpose of illustration only and not by way of limitation and that changes and modifications may be made therein without departing from the spirit and the scope of the invention.

Having thus described my invention, what I claim and desire to protect by Letters Patent is:

A combination measuring instrument for making measurements on V-belt and V-belt pulleys comprising a flat plane member having a first graduated straight edge terminating at one end in a projecting portion providing a second straight edge parallel to the first, a second flat member, said members being pivotally attached together in overlying parallel relationship, said second flat member having a first straight edge extending radially from the point of attachment and a second straight edge perpendicular to said first straight edge, said second straight edge of said second flat member terminating at one end in a short narrow projecting portion of a length to extend in one direction from said point of attachment a relatively short distance across said first graduated straight edge on said first member so that it can be extended into the groove of a V-belt pulley, said second straight edge of said second flat member extending in the other direction a considerably greater distance beyond said second parallel straight edge on said first member whereby one side of a V-belt may be placed in contact therewith, a pair of graduated arcuate concentric scales on said first member, said scales having their center of curvature at said point of attachment, said first straight edge of said second member being of a length to extend across said scale so that it may serve as an indicator line, the graduations of one of said scales being such as to give a reading at the point where said first straight edge of said second member crosses said scale equal to twice the value of the angle existing between said second straight edge on said second member and a line perpendicular to said first straight edge on said first member whereby a direct reading of the groove angle of a V-belt pulley may be made, the graduations on the other of said scales being such as to give a reading at the point where said first straight edge of said second member crosses said scale equal to the value of the angle existing between said second straight edge on said second member and the second straight edge on said first member whereby a direct reading of V-belt angle may be made, and a reference line on said first member parallel to said graduated straight edge whereby when said members are angularly adjusted relative to each other so that said second straight edge of said second flat member is in alignment with said reference line, said first straight edge of said second flat member will extend beyond said first graduated straight edge on said first member and form a right angle square which may be used to measure the thickness of a V-belt.

FINLEY R. PORTER, Jr.

References Cited in the file of this patent

UNITED STATES PATENTS

| Number | Name | Date |
|---|---|---|
| 774,858 | Trisler | Nov. 15, 1904 |
| 784,652 | Beardsley | Mar. 14, 1905 |
| 1,247,866 | Olmsted | Nov. 27, 1917 |
| 1,299,978 | MacDowney | Apr. 8, 1919 |
| 2,023,539 | Packard | Dec. 10, 1935 |
| 2,316,189 | Schaefer | Apr. 13, 1943 |